United States Patent
Schantl et al.

(10) Patent No.: US 11,780,504 B2
(45) Date of Patent: Oct. 10, 2023

(54) FRAME DEVICE FOR A VEHICLE, IN PARTICULAR FOR A MOTOR VEHICLE, AND VEHICLE HAVING AT LEAST ONE SUCH FRAME DEVICE

(71) Applicant: AUDI AG, Ingolstadt (DE)

(72) Inventors: Gilbert Schantl, Munich (DE); Ruben Goldberg, Ingolstadt (DE); Thomas Klinger, Ingolstadt (DE); Marek Bujak, Wellheim (DE); Hans-Peter Frensch, Ingolstadt (DE); Martin Dobel, Ingolstadt (DE); Eike Malte Manske, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 68 days.

(21) Appl. No.: 17/434,179

(22) PCT Filed: Jan. 21, 2020

(86) PCT No.: PCT/EP2020/051432
§ 371 (c)(1),
(2) Date: Aug. 26, 2021

(87) PCT Pub. No.: WO2020/177942
PCT Pub. Date: Sep. 10, 2020

(65) Prior Publication Data
US 2022/0144343 A1    May 12, 2022

(30) Foreign Application Priority Data
Mar. 7, 2019 (DE) .................... 10 2019 203 104.8

(51) Int. Cl.
*B62D 21/11*    (2006.01)
*B62D 3/00*    (2006.01)
*B62D 27/06*    (2006.01)

(52) U.S. Cl.
CPC ............... *B62D 21/11* (2013.01); *B62D 3/00* (2013.01); *B62D 27/065* (2013.01)

(58) Field of Classification Search
CPC ........ B62D 21/11; B62D 3/00; B62D 27/065; B62D 3/12
See application file for complete search history.

(56) References Cited

U.S. PATENT DOCUMENTS

| 6,511,096 B1 | 1/2003 | Reinhard et al. |
| 2006/0082121 A1 | 4/2006 | Kakuta et al. |

(Continued)

FOREIGN PATENT DOCUMENTS

| CN | 109334754 A | 2/2019 |
| DE | 3871923 T2 | 12/1992 |

(Continued)

OTHER PUBLICATIONS

German Search Report dated Feb. 14, 2020 in corresponding German Application No. 10 2019 203 104.8; 16 pages; Machine translation attached.

(Continued)

*Primary Examiner* — Paul N Dickson
*Assistant Examiner* — Shams Dhanani
(74) *Attorney, Agent, or Firm* — Maier & Maier, PLLC

(57) ABSTRACT

A frame device for a vehicle, including a subframe which can be attached to a structure of the vehicle and which has two side members spaced apart from one another in the transverse direction of the subframe and at least one cross member via which the side members are interconnected. The frame device also includes at least one support element, which is formed separately from the subframe and has at least one attachment element by which at least one component of the vehicle can be attached to the support element, and a steering gear which is formed separately from the (Continued)

subframe and separately from the support element for a steering system of the vehicle. Both the steering gear and the support element are attached to the subframe by one and the same fastening element.

15 Claims, 2 Drawing Sheets

(56) References Cited

U.S. PATENT DOCUMENTS

| | | |
|---|---|---|
| 2007/0169982 A1 | 7/2007 | Ogawa et al. |
| 2016/0257335 A1 | 9/2016 | Dieudonne et al. |
| 2020/0164922 A1* | 5/2020 | Park ..................... B62D 25/082 |
| 2020/0391797 A1* | 12/2020 | Viereck ................... B60K 1/00 |
| 2022/0144343 A1* | 5/2022 | Schantl ................ B62D 27/065 |

FOREIGN PATENT DOCUMENTS

| | | |
|---|---|---|
| DE | 10229161 A1 | 4/2003 |
| DE | 102011010114 A1 | 3/2012 |
| DE | 102017214955 A1 | 2/2019 |
| EP | 1731409 A1 | 12/2006 |
| JP | 2011-240787 A | 12/2011 |

OTHER PUBLICATIONS

International Search Report (with English translation) and Written Opinion (with Machine translation) dated Apr. 28, 2020 in corresponding International Application No. PCT/EP2020/051432; 21 pages.
International Preliminary Report on Patentability dated Aug. 25, 2021 in corresponding International Application No. PCT/EP2020/051432; 14 pages.
Office Action dated Jun. 19, 2023, in corresponding Chinese Patent Application No. 202080019114.4, 18 pages.

* cited by examiner

FRAME DEVICE FOR A VEHICLE, IN PARTICULAR FOR A MOTOR VEHICLE, AND VEHICLE HAVING AT LEAST ONE SUCH FRAME DEVICE

FIELD

The invention relates to a frame device for a vehicle, particularly for a motor vehicle. In addition, the invention relates to a vehicle, particularly a motor vehicle having at least one such frame device.

BACKGROUND

U.S. Pat. No. 6,511,096 B1 discloses a chassis subframe for a vehicle, in which the chassis subframe can be attached to a structure of the vehicle.

SUMMARY

The object of the present invention is to obtain a frame device and a vehicle such that especially high stiffness can be realized in a manner beneficial to weight and cost.

This object is achieved according to the invention by a frame device and a vehicle.

A first aspect of the invention relates to a frame device for a vehicle, which is preferably formed as a motor vehicle. The motor vehicle in this case can be formed as an automobile, particularly as a passenger car. The frame device comprises at least one subframe which can be attached to a structure of the vehicle and thus formed separately from the structure, which subframe can be characterized or formed, for example, also as a frame, suspension subframe, axle frame, or axle beam. The structure is preferably a self-supporting body. The feature that the subframe is formed separately from the structure, particularly from the body, should particularly be understood to mean that the subframe is not a component of the structure or of the body.

The subframe has at least or precisely two side members spaced apart from one another in the transverse direction of the subframe. Particularly in the installation position of the subframe or of the frame device, the transverse direction of the subframe coincides with the transverse direction of the vehicle, in which the subframe or the frame device assumes the installation position in the completely manufactured state of the vehicle. In this completely manufactured state of the vehicle, the frame device and thus the subframe are mounted, i.e. retained or attached, to the vehicle or to the structure.

The subframe further comprises at least one cross member, which extends at least substantially in the transverse direction or in the transverse direction of the vehicle. The side members are connected to one another via the cross members. To this end, the cross member is connected to the side member at both ends. In particular, it is conceivable that the subframe has the aforementioned cross member and at least or precisely one further cross member such that the subframe comprises at least or precisely two cross members. The side members are connected to one another via the cross members, in which the several cross members can be spaced apart from one another in the longitudinal direction of the subframe. Particularly in the installation position of the frame device or of the subframe, the longitudinal direction of the subframe coincides with the transverse direction of the vehicle. Thus, when the longitudinal direction is mentioned in the following, this should be understood to mean simultaneously the longitudinal direction of the vehicle and vice versa. Furthermore, when the transverse direction is mentioned in the following, this should be understood to mean simultaneously the transverse direction of the vehicle and vice versa.

In order to then be able to implement especially high stiffness, particularly of the subframe per se and thus of the structure, in a manner that is especially beneficial to cost and weight, it is provided according to the invention that the frame device comprises at least one support element formed separately from the subframe and separately from the structure, which support element has at least one attachment element. At least one vehicle component which is formed separately from the structure, separately from the subframe, and separately from the support element can be attached or is attached to the support element by means of the attachment element. Thus, the support element is a component or unit carrier, to which at least the component, particularly several components, of the motor vehicle can be attached or is attached.

In addition, the frame device comprises a steering gear for a steering system of the vehicle, which is provided separately from the structure, separately from the subframe, separately from the support element, and separately from the component, and thus in addition to the structure, in addition to the subframe, in addition to the support element, and in addition to the component. In the completely manufactured state of the vehicle, a steering handle, which is arranged or can be arranged in the interior of the vehicle, is coupled or can be coupled, via the steering gear, to steerable or steered vehicle wheels of the motor vehicle by means of the steering wheel such that the vehicle wheels can be steered via the steering gear by means of the steering wheel and thus can be pivoted relative to the structure. The steering handle is, for example, a steering wheel, which can be rotated around an axis of rotation of the steering wheel relative to the structure in order to thereby steer the vehicle wheels via the steering gear. The vehicle wheels are ground-contact elements, by means of which the vehicle can be supported or supported downwardly on a piece of ground in the vertical direction of the vehicle. If the vehicle is moved along the ground while it is being supported on the ground by the vehicle wheels, the wheels roll on the ground.

Furthermore, it is provided according to the invention that both the steering gear and the support element are attached to the subframe by means of one and the same fastening element. The fastening element is thus assigned both to the steering gear and to the support element and is used to attach both the steering gear and the support element, particularly simultaneously, to the subframe. The number of parts and thus the weight, the costs, and the installation space needed can thereby be kept especially low. In addition, the subframe can hereby be braced effectively by means of the support element such that especially high stiffness of the subframe and thus of the structure can be implemented.

It has proven to be especially advantageous when both the steering gear and the support element are attached to the subframe at a first attachment point or in a first attachment region by means of one and the same and thus by means of the aforementioned fastening element. In this case, both the steering gear and the support element are furthermore attached to the subframe, at a second attachment point spaced apart from the first attachment point or in a second attachment region spaced apart from the first attachment region, by means of one and the same fastening element. This means that at least one second fastening element is provided which is assigned, particularly simultaneously, to both the support element as well as the steering gear and is used to attach both the steering gear and the support element, particularly simultaneously, to the subframe. In other words, at least two attachment points are provided, to which the steering gear and the support element are attached to the subframe, in which each attachment point is provided with at least or precisely one fastening element, by means of which both the steering gear and the support element are attached, particularly simultaneously, to the subframe at the respective attachment point. The number of parts, the weight, and the cost can thereby be kept especially low while especially high stiffness can simultaneously be realized.

Because the attachment points are spaced apart from one another, it is preferably provided that an air gap or an air space is arranged between the attachment points so that the attachment points are spaced apart from one another via this air space representing an interspace. In doing so, the support element, which is formed or functions, for example, as a bridge, extends from one of the attachment points to the other attachment point without interruption such that the distance between the attachment points is bridged by the support element. The subframe can thereby be especially effectively stiffened or braced.

A further embodiment is characterized in that the attachment points are spaced apart from one another in the transverse direction of the subframe. Thus, the support element, for example, extends from the one attachment point to the other attachment point without interruption, in the transverse direction of the subframe, such that the support element, for example, is formed as a cross-bridge. Especially high stiffness can thereby be ensured.

Preferably, the attachment points are arranged at the same height in the longitudinal direction of the subframe such that especially high stiffness can be ensured.

A further embodiment is characterized in that the fastening element comprises at least or precisely one screw element, which is arranged or accommodated partially in a first opening of the steering gear and partially in a second opening of the support element.

Both the steering gear and the support element can thereby be connected to the subframe in a manner that is beneficial to weight and cost and is also rigid.

It has been shown to be especially advantageous in this case when the openings are formed as passage openings, each of which is completely penetrated by the screw element. The steering gear and the support element can thereby be connected to the subframe in an especially rigid and durable manner.

The screw element is preferably a screw which has a first thread. The first thread is preferably formed as an external thread.

It has been shown to be especially advantageous when the subframe has a third opening in which the screw element is accommodated. Preferably, the first opening and the second opening are free of thread, particularly free of internal thread, so that the screw element can be inserted through the first opening and through the second opening or inserted into the first opening and into the second opening in a manner which is simple and thus beneficial in terms of time and cost.

The third opening can be formed as a threaded opening and accordingly have a second thread corresponding to the first thread, which second thread is formed, for example, as an internal thread. It is conceivable in this case that the screw element is screwed into the second thread or is screwed to the second thread. The support element and the steering gear can thereby be connected to the subframe in a manner that is simple, beneficial to time and cost, and especially beneficial to weight, and rigid.

However, it is further conceivable that the third opening is formed as a third passage opening which is completely penetrated by the screw element. In this case, it is preferably provided that the third opening is free of thread, especially free of internal thread, such that the screw element can be especially easily inserted into the third opening or inserted through the third opening.

In order to realize an especially high level of stiffness, it is provided in a further embodiment of the invention that the fastening element has a second screw element, to which the first screw element is screwed. The second screw element is, for example, a nut, which has a second thread corresponding particularly to the first thread. The second thread, for example, is an internal thread.

In an especially advantageous embodiment of the invention, the frame device according to the invention comprises the component, provided in addition to the steering gear, which component is a component of the frame device in this embodiment. The component in this case is attached, particularly reversibly detachably, to the support element by means of the attachment element and thereby retained on the support element.

It has been shown to be advantageous in this case when the component is formed as a structural element of an air-conditioning system for the vehicle. For example, the fastening element is an air-conditioning compressor, by means of which refrigerant from the air-conditioning system can be compressed. Furthermore, it is conceivable that the component is formed as an energy storage device formed for storing electrical energy, which energy storage device can be formed, for example, as a battery, particularly as a high-voltage battery (HV battery). In addition, it is possible that the component is formed as a drive motor, by means of which the vehicle can be driven. Thus, the vehicle is, for example, a motor vehicle. The drive motor can be formed as an internal combustion engine or combustion motor. Furthermore, it is conceivable that the drive motor is an electric machine, which can be operated in motorized operation and thus as an electric motor. The vehicle can be electrically driven for example, particularly purely, by means of the electric motor. Thus, the vehicle can be formed as an electric vehicle, particularly as a battery-electric vehicle. If the component is formed, for example, as the previously mentioned drive motor, the support element is a motor support for supporting or retaining the drive motor.

The invention is particularly based on the following knowledge: In vehicles such as, for example, electric vehicles, it is often the case, due to reasons of installation space and due to an arrangement of fastening elements in an available installation space, particularly in the region of a front axle, that a steering system connection and a structure for a motor suspension, i.e. for retention of a drive motor and/or of components different from a drive motor such as, for example, air-conditioning systems, components, batteries, etc., are located in the same installation space, particularly if the drive motor and/or components situated over the drive motor are mounted on the subframe formed, for example, as an axle beam, particularly as a front axle support, for reasons of an advantageous assembly.

According to the invention, the support element is then provided at least as a structure supporting the aforementioned component, which structure may be arranged, for example, at or on an axle, particularly at or on a front axle or in the region of an axle, particularly in the region of a front axle. For example, the supporting structure is arranged over the drive motor, on a front or in a front region of the vehicle. Furthermore, it is conceivable that the supporting structure is arranged under the drive motor in the vertical direction of the vehicle and/or behind the drive motor in the longitudinal direction of the vehicle. The supporting structure is then attached to the subframe together with the steering system or with the steering gear and, while doing so, screwed, for example, to the subframe or screwed onto the subframe. This results, for example, in a screw assembly, which comprises the steering gear, the subframe, and the support element formed or functioning, for example, as a cross member. This screw assembly can be a module which can be especially easy-to-handle and mounted. The support element, the subframe, and the steering system or the steering gear are individual parts of the steering assembly which are formed separately from one another and connected to one another. Depending on the design, the individual parts can be designed such that they provide mutual support. For example, an especially advantageous embodiment of the steering gear, particularly the steering system housing thereof, can be represented, because, for example, the upper screw supports do not have to be cranked. For example, the steering gear is attached to the subframe over the aforementioned steering system housing by means of the same fastening element, respectively.

The aforementioned attachment points each have, for example, a support or contact surface, on which the steering gear, particularly the steering system housing, or preferably the support element, is supported, particularly directly, and is thus flush. If the respective fastening element is formed, for example, as a screw element such that the steering gear and the support element are screwed onto the subframe or screwed to the subframe, the respective support surface is a screw-on surface. Because the attachment points are spaced apart from one another, the support surfaces are also spaced apart from one another such that there is a distance between the support surfaces which extends particularly in the transverse direction of the subframe. The distance is also characterized as a gap which is bridged by the support element functioning, for example, as a cross-structure. In this case, an especially advantageous embodiment of the support element can be realized, for example, because a quasi-double-shear connection can be realized due to the use of the steering gear.

In comparison with conventional solutions, a savings in weight and cost can be realized, because the number of connection elements for attaching the steering gear and the support element to the subframe can be kept especially low. In addition, an especially simple and rigid embodiment of the subframe can be realized. In an advantageous design, the individual parts can support one another in a manner and form to the extent that weight can be saved and stiffness can be obtained as compared to conventional solutions.

A second aspect of the invention relates to a vehicle preferably formed as a motor vehicle, particularly as an automobile, and very especially as a passenger car, which comprises a structure formed, for example, as a self-supporting body and at least or precisely one frame device according to the invention, in accordance with the first aspect of the invention. The frame device comprises at least one subframe formed separately from the structure and attached to the structure, which subframe has two side members spaced apart from one another in the transverse direction of the vehicle. In addition, the subframe has at least one cross member, via which the side members can be connected to each other.

In order to then realize an especially high level of stiffness in a manner especially beneficial to weight and cost, it is provided with the second aspect of the invention that the vehicle, particularly the frame device, comprises a support element formed separately from the subframe and separately from the structure, which support element has at least one attachment element. At least one vehicle component which is formed separately from the structure, separately from the subframe, and separately from the support element is attached to the support element and thus retained by means of the attachment element.

Furthermore, the vehicle, particularly the frame device, comprises a steering gear of a steering system of the vehicle, which steering gear is formed separately from the subframe, separately from the support element, separately from the structure, and separately from the component, and additionally thereto, in which both the steering gear and the support element are attached to the subframe by means of one and the same fastening element. Advantages and advantageous embodiments of the first aspect of the invention should be considered advantages and advantageous embodiments of the second aspect of the invention and vice versa.

The invention also includes refinements of the vehicle according to the invention, which have features as they have already been described in association with the refinements of the frame device according to the invention. For this reason, the corresponding refinements of the vehicle according to the invention are not described again here.

The vehicle according to the invention is designed preferably as a motor vehicle and preferably as an automobile, particularly as a passenger car or commercial vehicle, or as a passenger bus or motorcycle. The invention also comprises the combinations of the features of the described embodiments.

BRIEF DESCRIPTION OF THE FIGURES

An exemplary embodiment of the invention is described in the following. The following is shown.

DETAILED DESCRIPTION

Figure 1:
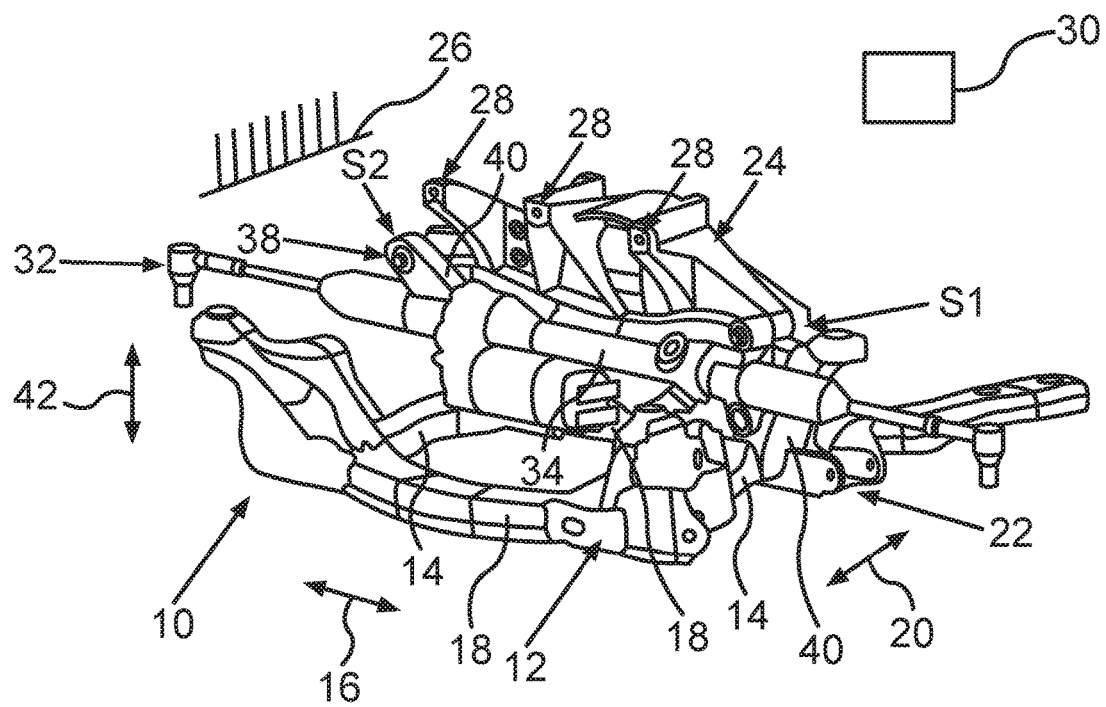
FIG. 1 a schematic perspective view of a frame device according to the invention.

The exemplary embodiment explained in the following refers to a preferred embodiment of the invention. With the exemplary embodiment, the described components of the embodiment represent individual features to be considered independently of one another, which also further embody the invention independently of one another. Thus, the disclosure should also comprise combinations of the features of the embodiment other than those shown. Furthermore, the described embodiment can also be supplemented through further described features of the invention.

The same reference numerals refer to equivalent features and functions in the figures.

FIG. 1 shows a schematic perspective view of a frame device 10 for a vehicle, which is preferably formed as a motor vehicle, and as an automobile for example in this case, particularly as a passenger car. This means that the vehicle in its completely manufactured state has the frame device 10. In addition, the vehicle in its completely manufactured state comprises a structure preferably formed as a self-supporting body. In this case, the frame device 10 is formed separately from the structure and mounted to the body in the completely manufactured state of the vehicle and thus retained on the body.

The frame device 10 in this case has a subframe 12 which is formed separately from the body and is attachable or attached to the body. The subframe 12 has at least or precisely two side members 14 which are spaced apart from one another in the transverse direction of the subframe 12. The transverse direction of the subframe 12 is indicated by a double arrow 16 in FIG. 1 and coincides with the transverse direction of the vehicle in the completely manufactured state of the motor vehicle. Meanwhile, in the completely manufactured state of the vehicle, the frame device 10 assumes its installation position, in which the transverse direction of the subframe 12 coincides with the transverse direction of the vehicle. In addition in this case, in the completely manufactured state of the vehicle, the subframe 12 assumes its installation position, in which the transverse direction of the subframe 12 coincides with the transverse direction of the vehicle.

Moreover, the subframe 12 has at least or precisely two cross members 18 which are spaced apart from one another in the longitudinal direction of the subframe 12. The longitudinal direction of the subframe 12 in this case is indicated by a double arrow 20 in FIG. 1 and coincides with the longitudinal direction of the vehicle in the installation position and thus in the completely manufactured state of the vehicle. The side members 14 are connected to one another in this case via the cross members 18.

The subframe 12 has, for example, coupling elements, of which one coupling element designated as 22 can be seen in FIG. 1. By means of the respective coupling element, at least or precisely one steering wheel is to be retained or is retained flexibly on the subframe 12 in order to guide a respective wheel of the vehicle such that the respective wheel of the vehicle is retained flexibly on the subframe 12 via the respective steering wheel. By means of the respective steering wheel, the respective wheel of the vehicle is guided relative to the subframe 12 and relative to the body. The respective wheel of the vehicle is simply designated also as a wheel and is a ground-contact element, by means of which the vehicle can be supported or is supported downwardly on a piece of ground in the vertical direction of the vehicle.

In order to then be able to implement especially high stiffness of the frame device 10 and of the structure (body) in a manner that is especially beneficial in terms of weight and cost, the frame device 10 and thus the vehicle comprise at least one support element 24 formed separately from the subframe 12 and separately from the body, which support element is formed or functions as a cross-structure or cross-bridge in the exemplary embodiment shown in the figure. The body is shown especially schematically in FIG. 1 and designated as 26. The support element 24 has attachment elements 28, by means of which at least one component 30 of the vehicle can be attached or is attached to the support element 24 and thus to the frame device 10, which component is formed separately from the body 26, separately from the subframe 12, and separately from the support element 24, which component is provided in addition thereto and is especially schematically shown in FIG. 1. The component 30 is, for example, an energy storage device formed for storing electrical energy, which energy storage device can be formed as a battery, particularly as a high-voltage battery. Furthermore, the component 30 may be a structural element of an air-conditioning system of the vehicle, in which the component 30 is formed, for example, as a refrigerant compressor or compressor. In addition, it is conceivable that the component 30 is an electric machine, by means of which the aforementioned vehicle wheels and thus the motor vehicle can be electrically driven. Thus, the support element 24 is, for example, a motor support or a motor bearing, on which the electric machine 30 is retained or mounted.

The frame device 10 and thus the vehicle additionally comprise a steering gear 32, formed separately from the body 26, separately from the subframe 12, separately from the component 30, and separately from the support element 24, and provided additionally thereto, for a steering system of the vehicle. By means of the steering system, the aforementioned vehicle wheels, for example, can be steered and thus pivoted about a respective steering axis relative to the body 26 in order to thereby effect, for example, a lane change and curve-driving of the vehicle.

In the completely manufactured state of the vehicle, a steering handle is arranged in the interior thereof, which steering handle can be moved relative to the body 26, for example, by the driver of the vehicle. The steering handle is, for example, a steering wheel, which can be rotated about a steering wheel axis relative to the body 26. The steering handle is coupled to the vehicle wheels via the steering gear 32 or via the steering system such that the vehicle wheels can be steered, via the steering system and thus by the steering gear 32, by means of the steering handle. To this end, the steering handle is moved relative to the body 26, for example, by the driver, particularly rotated about the axis of rotation of the steering wheel. The steering gear 32 has a housing 34, which is also designated as a steering housing or steering system housing. For example, the steering gear 32 is formed as a hydraulic, electric, electro-mechanical, or electro-hydraulic steering gear, such that, for example, the steering gear 32 can support the driver electrically, hydraulically, electro-hydraulically, or electro-mechanically when steering the vehicle.

Figure 2:
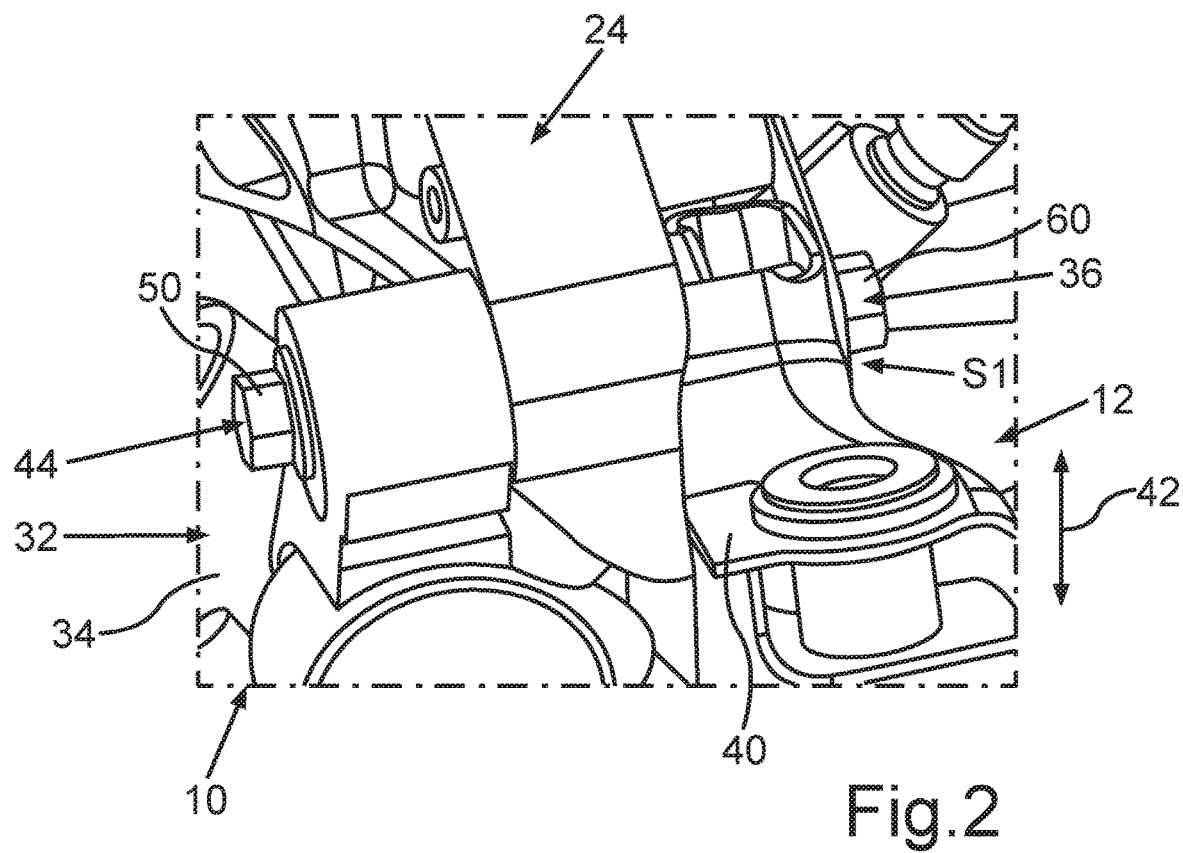
FIG. 2 a schematic perspective view of the frame device as a section.
Figure 3:
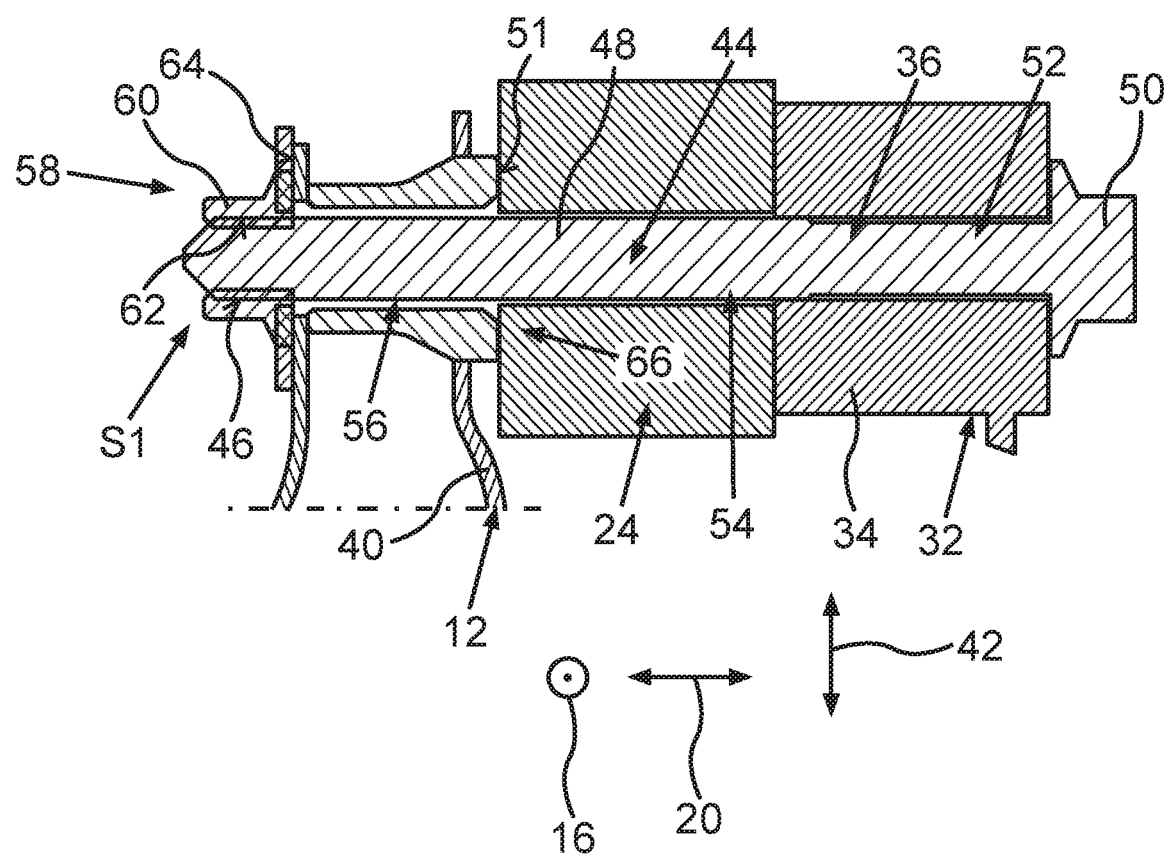
FIG. 3 a schematic sectional view of the frame device as a section.

Furthermore, it is provided that—as can be seen when viewing FIGS. 2 and 3 together—both the steering gear 32 and the support element 24 are attached to the subframe at 12 by means of one and the same fastening element 36 or 38. In this case, both the steering gear 32 and the support element 24 are attached to the subframe 12 at a first attachment point S1 by means of one and the same fastening element 36. In addition, both the steering gear 32 and the support element 24 are attached to the subframe 12 at a second attachment point S2, which is spaced apart from the first attachment point S1 in the transverse direction, by means of one and the same fastening element 38.

Attachment points S1 and S2 in this case are spaced apart from one another in the transverse direction of the subframe 12 such that an air space, i.e. an interspace filled with air, is arranged between attachment points S1 and S2 in the transverse direction of the subframe 12. Thus, attachment points S1 and S2 are spaced apart from one another in the transverse direction via this interspace such that there is a distance, extending along the transverse direction and also designated as a gap, between attachment points S1 and S2. The support element 24, which is a single part or multiple parts for example, extends in the transverse direction of the vehicle without interruption, from attachment point S1 to attachment point S2 or vice versa, whereby the aforementioned gap is bridged by the support element 24.

The subframe 12 has, for example, two columns 40 spaced apart from one another in the transverse direction, which columns extend upwardly away from the side members in the vertical direction of the subframe 12. In this case, the vertical direction is indicated by a double arrow 42 in FIG. 1, in which the vertical direction in the installation position coincides with the vertical direction of the vehicle. Attachment points S1 and S2 in this case are formed by the columns 40. Thus, the steering gear 32 and the support element 24 are connected to the columns 40 by means of one and the same fastening element 36 and 38 and thus attached to the subframe 12, whereby the subframe 12 is effectively stiffened.

As can be seen especially well in FIGS. 2 and 3, the respective fastening element 36 or 38 comprises a screw element in the form of a screw 44 which has a first thread in the form of an external thread 46. The external thread 46 is formed on a screw shaft 48 of the screw 44, in which the screw shaft 48, which is simply designated as the shaft, is connected to a screw head 50 of the screw 44. In particular, the screw head 50, which is simply designated as the head, is formed as one piece with the screw shaft 48. The screw 44 is supported along its longitudinal extension direction, particularly directly, on the housing 34 and thus on the steering gear 32 via the screw head 50, in which the longitudinal extension direction of the screw 44 coincides with the longitudinal direction of the subframe 12. The housing 34 is arranged between the support element 24 and the screw head 50 in the longitudinal extension direction of the screw 44 such that the screw head 50 is supported on the support element 24 in the longitudinal extension direction of the screw 44, with the assistance of the housing 34. In addition, the support element 24 is arranged between the housing 34 and the respective column 40 or the subframe 12 in the longitudinal extension direction of the screw 44 such that the housing 34 is supported on the column 40 or on the subframe 12 in the longitudinal extension direction of the screw 44, with the assistance of the support element 24. In this case, the support element 24, for example, is supported, particularly directly, on the column 40, particularly on a support surface 51 of the column 40 or of the subframe 12, along the longitudinal extension direction of the screw 44. Thus, the support element 24, for example, rests directly on the support surface 51 along the longitudinal extension direction of the screw 44.

In addition, it can be seen from FIG. 3 that the housing 34 has a first opening 52 in the form of a first passage opening, the support element 24 has a second opening 54 in the form of a second passage opening, and the column 40 or the subframe 12 has a third opening 56 in the form of a third passage opening. Openings 52, 54, and 56 have no thread or are thread-free such that the screw 44 can be especially easily inserted through the passage openings along the longitudinal extension direction of the screw, particularly until the screw head 50 comes into supportive contact with the housing 34 along the longitudinal extension direction of the screw 44. In the present case, the screw head 50 rests on the housing 34, particularly directly, along the longitudinal extension direction of the screw 44. The passage openings in this case are respectively completely penetrated by the screw 44, particularly by the screw shaft 48, particularly such that the screw shaft 48 protrudes from the opening 56 on a side 58 of the column 40 facing away from the support element 24 and the housing 34 in the longitudinal extension direction of the screw 44. In doing so, particularly the external thread 46 protrudes from the opening 56 on the side 58.

In this case, the respective fastening element 36 or 38 comprises a second screw element, in the form of a nut 60 in the present case, which has a second thread in the form of an internal thread 62 corresponding to the external thread 46. The external thread 46 in this case is screwed into the internal thread 62 such that the screw 44 is screwed to the nut 60. The nut 60 in this case is supported, particularly directly, on a second support surface 64 of the column 40 or of the subframe 12 along the longitudinal extension direction of the screw 44 such that, for example, the nut 60 rests directly on the support surface 64. While support surface 64 is arranged on side 58, support surface 51 is arranged on a second side 66 of the column 40 or of the subframe 12, which side is facing away from the support surface 64 in the longitudinal extension direction of the screw 44. Side 66 in this case is facing away from the nut 60 along the longitudinal extension direction of the screw 44. As a whole, it can be seen that the housing 34 and thus the steering gear 32 and the support element 24 are tensioned against the subframe 12 by means of fastening element 36 or 38 and by means of the screw 44 and by means of the nut 60 in the present case and are thereby attached to the subframe 12, particularly reversibly detachably attached. To this end, the external thread 46 and the internal thread 62 are screwed together.

As a whole, it can be seen that the support element 24 is a structure supporting the component 30, which structure is screwed to the subframe 12 or screwed onto the subframe 12 together with the steering system. This results in a screw assembly, which comprises the support element 24 formed as a cross member, the steering system or the steering gear 32, and the subframe 12. Because the support element 24 and the steering gear 32 are attached to the subframe 12 by screws in the present case, the respective support surface 51 or 64 is a screw-on surface also designated as a screw face. The respective screw face extends, for example, in a plane which is spanned by the transverse direction of the vehicle and the vertical direction of the vehicle. Due to this connection of the steering gear 32 and of the support element 24 to the subframe 12, the number of fastening elements and attachment points can be kept especially low such that the cost and weight can be kept especially low. In addition, the subframe 12 and particularly the support element 24 and the steering gear 32 can be advantageously designed in order to realize a high level of stiffness and a low weight.

The invention claimed is:

1. A frame device for a vehicle, comprising a subframe, at least one support element, a steering gear, and at least one component,
    wherein the subframe, the at least one support element, the steering gear, and the at least one component are all formed separately from one another,
    wherein the subframe is attachable to a structure of the vehicle and comprises two side members spaced apart from one another in a transverse direction of the subframe and at least one cross member via which the side members are interconnected,
    wherein the at least one support element comprises at least one attachment element by which the at least one component of the vehicle is attachable to the support element, and
    wherein both the steering gear and the support element are attached to the subframe by a first fastening element at a first attachment point and by a second fastening element at a second attachment point, the first attachment point spaced apart from the second attachment point in the transverse direction.

2. The frame device according to claim 1, wherein the first and second fastening elements each comprise a first screw element, which are each respectively arranged partially in a first opening of the steering gear and partially in a second opening of the support element.

3. The frame device according to claim 2, wherein the openings are formed as passage openings, each of which are respectively penetrated completely by the first screw elements.

4. The frame device according to claim 3, wherein the subframe has a third opening, in which the first screw elements are each respectively accommodated.

5. The frame device according to claim 2, wherein the first and second fastening elements each have a second screw element, to which the first screw elements are respectively screwed.

6. The frame device according to claim 1, wherein the component is formed as at least one of:
a structural element of an air-conditioning system for the vehicle,
an energy storage device for storing electrical energy, and
a drive motor for driving the vehicle.

7. A vehicle comprising the frame device according to claim 1.

8. A frame device for a vehicle, comprising a subframe, at least one support element, a steering gear, and at least one component,
wherein the subframe, the at least one support element, the steering gear, and the at least one component are all formed separately from one another,
wherein the subframe is attachable to a structure of the vehicle and comprises two side members spaced apart from one another in a transverse direction of the subframe and at least one cross member via which the side members are interconnected,
wherein the at least one support element comprises at least one attachment element by which the at least one component of the vehicle is attachable to the support element, and
wherein both the steering gear and the support element are attached to the subframe by a first fastening element, and
wherein the component is formed as at least one of:
a structural element of an air-conditioning system for the vehicle,
an energy storage device for storing electrical energy, and
a drive motor for driving the vehicle.

9. The frame device according to claim 8, wherein both the steering gear and the support element are attached to the subframe at a first attachment point by the first fastening element, and
wherein both the steering gear and the support element are attached to the subframe at a second attachment point, which is spaced apart from the first attachment point, by a second fastening element.

10. The frame device according to claim 9, wherein the first and second attachment points are spaced apart from one another in the transverse direction of the subframe.

11. The frame device according to claim 8, wherein the fastening element comprises a screw element, which is arranged partially in a first opening of the steering gear and partially in a second opening of the support element.

12. The frame device according to claim 11, wherein the openings are formed as passage openings, each of which is penetrated completely by the screw element.

13. The frame device according to claim 12, wherein the subframe has a third opening, in which the screw element is accommodated.

14. The frame device according to claim 11, wherein the fastening element has a second screw element, to which the first screw element is screwed.

15. A vehicle comprising the frame device according to claim 8.

* * * * *